United States Patent [19]

Peters et al.

[11] 4,229,282
[45] Oct. 21, 1980

[54] CATALYTIC DEWAXING OF HYDROCARBON OILS

[75] Inventors: Alan W. Peters, Moorestown; Emmerson Bowes, Woodstown; Thomas R. Stein, Cherry Hill, all of N.J.

[73] Assignee: Mobil Oil Corporation, New York, N.Y.

[21] Appl. No.: 33,775

[22] Filed: Apr. 27, 1979

[51] Int. Cl.³ .................. C10G 47/16; C10G 71/00
[52] U.S. Cl. .................. 208/111; 208/18; 208/59; 208/87
[58] Field of Search .................. 208/111, 18, 120

[56] References Cited

U.S. PATENT DOCUMENTS

| | | | |
|---|---|---|---|
| Re. 28,398 | 4/1975 | Chen et al. | 208/111 |
| 3,668,113 | 6/1972 | Burbidge et al. | 208/97 |
| 3,700,585 | 10/1972 | Chen et al. | 208/111 |
| 3,755,138 | 8/1973 | Chen et al. | 208/111 X |
| 3,902,988 | 1/1974 | Bennett et al. | 208/80 |
| 3,929,616 | 12/1975 | Mead et al. | 208/87 |
| 3,968,024 | 7/1976 | Gorring et al. | 208/111 |
| 3,970,544 | 7/1976 | Rosinski et al. | 208/111 |

*Primary Examiner*—Delbert E. Gantz
*Assistant Examiner*—G. E. Schmitkons
*Attorney, Agent, or Firm*—Charles A. Huggett; Vincent J. Frilette

[57] ABSTRACT

An improved process for catalytically dewaxing a hydrocarbon oil is disclosed. In this process the waxy oil is contacted in the presence of hydrogen with a dense zeolitic dewaxing catalyst associated with a nickel-tungsten hydrogenation component. The dewaxed oil has unexpectedly good stability and a low bromine number compared with prior-art processed oils. The process may be used to dewax crude oils, fuel oil fractions and lubricating oils.

17 Claims, No Drawings

CATALYTIC DEWAXING OF HYDROCARBON OILS

BACKGROUND OF THE INVENTION

1. Field of the Invention

This invention is concerned with a process for catalytically dewaxing a hydrocarbon oil. In particular, it is concerned with dewaxing a petroleum oil such as a whole crude, a reduced crude, or a distillate fraction thereof by contact with a zeolite catalyst exemplified by ZSM-5 associated with a nickel-tungsten hydrogenation component. It is further concerned with a process for manufacturing low pour point distillate fuels. It is still further concerned with a catalytic dewaxing process for manufacturing a high V.I. distillate lubricating oil stock of low pour point and good stability. Products produced by the method of this invention need less severe or no hydrofinishing, or less amounts of stabilizing additives, since they are inherently of improved stability.

2. Prior Art

Catalytic dewaxing of hydrocarbon oils to reduce the temperature at which separation of waxy hydrocarbons occurs is a known process. A process of that nature developed by British Petroleum is described in The Oil and Gas Journal dated Jan. 6, 1975, at pages 69–73. See also U.S. Pat. No. 3,668,113, which described dewaxing followed by hydrofinishing.

Reissue Pat. No. 28,398 to Chen et al, reissued Apr. 23, 1975, describes a process for catalytic dewaxing with a catalyst comprising a zeolite of the ZSM-5 type. A hydrogenation/dehydrogenation component may be present.

A process for dewaxing a gas oil is described in U.S. Pat. No. 3,956,102 issued May 11, 1976.

A mordenite catalyst containing a Group VI or a Group VIII metal is used to dewax a low V.I. distillate from a waxy crude, as described in U.S. Pat. No. 4,110,056 issued July 11, 1978.

U.S. Pat. No. 3,755,138 to Chen et al describes a process for mild solvent dewaxing to remove high quality wax from a lube stock, which is then catalytically dewaxed to specification pour point.

The patents and publications cited above are illustrative of the dewaxing art as applied to various hydrocarbon oils, including crude peteroleum. A number of other patents and publications are known, but applicant is not aware that any of these is particularly pertinent to his invention.

Petroleum products generally are required to have some specified stability properties consistent with intended use. This requirement is in addition to the requirement that the pour point or freeze point for certain oils be low enough to cause no flow problem. Thus, hydrocarbon oil products intended for use as jet fuel, lubricating oils, or as fuel oil, are sometimes treated with additives to improve oxidation stability, reduce deposit formation, or both. In other cases these oils are "hydrofinished" for the same reason. In still other cases both "hydrofinishing" and additives may be required to achieve the required stability.

Catalytic dewaxing followed by catalytic hydrofinishing is described in U.S. Pat. No. 3,894,938 issued July 15, 1975.

Each of the patents and publications cited above is incorporated herein by reference.

As is evident from the foregoing references, problems associated with waxy constituents in a hydrocarbon oil may occur with crude oil, jet fuel, home heating oil, and the distillate or residual fractions used to prepare lubricants. The resistance to low temperatures required for each of these products depends on the type of exposure encountered. For example, the permissible pour point of a crude to be transported by pipeline in Saudi Arabia may be considerably higher than that of a crude to be transported in Alaska. Furthermore, a jet fuel is required not to separate waxy material at a temperature above about $-40°$ F., for example, while a pour point for the common home heating oil of about $+20°$ F. would be satisfactory in a temperate climate. As a result of this diversity of requirements, a number of specifications have been developed which apply to different products. Some of these specifications, and the method by which they are determined, include: Pour Point, determined by ASTM Standard D97; Cloud Point, ASTM D-2500; Freeze Point, ASTM D-2836; and Cold Filter Plugging Point (CFPP), DIN 51428, SIS-155122, and AFNOR 549 Standards, Througout this specification, it will be understood that when the term Pour Point is used, the comparable Cloud Point, Freeze Point, or CFPP value may be substituted when appropriate.

Lubricating oils for use in automotive and aircraft engines must not vary too much in viscosity as temperature changes. This requirement is in addition to the requirements for satisfactory pour point and stability. Since the present invention is useful in the preparation of high quality lubricating oils, a brief summary of this highly developed and complex art is now given.

Although the broad principles involved in refining of lubricating oils are qualitatively understood, the art is encumbered by quantitative undertainties which require considerable resort to empiricism in practical refining. Underlying these quantitative uncertainties is the complexity of the molecular constitution of lubricating oils. Because lubricating oils for the most part are based on petroleum fractions boiling above about 450° F., the molecular weight of the hydrocarbon constituents is high and these constituents display almost all conceivable structures and structure types. This complexity and its consequences are referred to in "Petroleum Refinery Engineering", by W. L. Nelson, McGraw Hill Book Company, Inc., New York, N.Y., 1958 (Fourth Edition), relevant portions of this text being incorporated herein by reference for background.

In general, the basic notion in lubricant refining is that a suitable crude oil, as shown by experience or by assay, contains a quantity of lubricant stock having a predetermined set of properties such as, for example, appropriate viscosity, oxidation stability, and maintenance of fluidity at low temperatures. The process of refining to isolate that lubricant stock consists of a set of subtractive unit operations which removes the unwanted components. The most important of these unit operations include distillation, solvent refining, and dewaxing, which basically are physical separation processes in the sense that if all the separated fractions were recombined one would reconstitute the crude oil.

A refined lubricant stock may be used as such as a lubricant, or it may be blended with another refined lubricant stock having somewhat different properties. Or, the refined lubricant stock, prior to use as a lubricant, may be compounded with one or more additives which function, for example, as antioxidants, extreme pressure additives, and V.I. improvers. As used herein, the term "stock", regardless whether or not the term is further qualified, will refer only to a hydrocarbon oil without additives. The term "raw stock" will be used herein to refer to a viscous distillate fraction of crude petroleum oil isolated by vacuum distillation of a reduced crude from atmospheric distillation, and before further processing, or its equivalent. The term "solvent-refined stock" will refer to an oil that has been solvent refined, for example with furfural. The term "dewaxed stock" will refer to an oil which has been treated by any method to remove or otherwise convert the wax contained therein and thereby reduce its pour point. The term "waxy", as used herein will refer to an oil of sufficient wax content to result in a pour point greater than +25° F. The term "stock", when unqualified, will be used herein generically to refer to the viscous fraction in any stage of refining, but in all cases free of additives.

Briefly, for the preparation of a high grade distillate lubricating oil stock, the current practice is to vacuum distil an atmospheric tower residuum from an appropriate crude oil as the first step. This step provides one or more raw stocks within the boiling range of about 450° to 1050° F. After preparation of a raw stock of suitable boiling range, it is extracted with a solvent, e.g. furfural, phenol, or chlorex, which is selective for aromatic hydrocarbons, and which removes undesirable components. The raffinate from solvent refining is then dewaxed, for example by admixing with a solvent such as a blend of methyl ethyl ketone and toluene. The mixture is chilled to induce crystallization of the paraffin waxes which are then separated from the dissolved oil, and the dewaxed raffinate is then recovered by removal of the solvent.

Other processes such as hydrofinishing or clay percolation may be used if needed to reduce the nitrogen and sulfur content or improve the color and stability of the lubricating oil stock. Bright stocks are often deasphalted, e.g. by treatment with propane.

Viscosity Index (V.I.) is a quality parameter of considerable importance for distillate lubricating oils to be used in automotive engines and aircraft engines which are subject to wide variations in temperatures. This Index is a series of numbers ranging from 0 to 100 or more which indicate the rate of change of viscosity with temperature. A viscosity index of 100 indicates an oil that does not tend to become viscous at low temperature or become thin at high temperatures. Measurement of the kinematic viscosities of an oil at 40° and 100° C., and referral to established correlations, provides a measure of the V.I. of the oil. For purposes of the present invention, whenever V.I. is referred to it is meant the V.I. as determined by the ASTM Method D2270-77, published by ASTM, 1916 Race Street, Philadelphia 3, Pa., or equivalent, and accompanying tables, incorporated herein by reference.

To prepare high V.I. automotive and aircraft oils the refiner usually selects a crude oil relatively rich in paraffinic hydrocarbons, since experience has shown that crudes poor in paraffins, such as those commonly termed "naphthene-base" crudes yield little or no refined stock having a V.I. above about 40. (See Nelson, supra, pages 80-81 for classification of crude oils). Suitable stocks for high V.I. oils, however, also contain substantial quantities of waxes which result in solvent-refined lubricating oil stocks of high pour point, i.e. a pour point substantially greater than +25° F. Thus, in general, the refining of crude oil to prepare acceptable high V.I. distillate stocks ordinarily includes dewaxing to reduce the pour point to not greater than +25° F. The refiner, in this step, often produces saleable paraffin wax by-product, thus in part defraying the high cost of the dewaxing step.

Raw distillate lubricating oil stocks usually do not have a particularly high V.I. However, solvent-refining, as with furfural for example, in addition to removing unstable and sludge-forming components from the crude distillate, also removes components which adversely affect the V.I. Thus, a solvent refined stock prior to dewaxing usually has a V.I. well in excess of specifications. Dewaxing, on the other hand, removes paraffins which have a V.I. of about 200, and thus reduces the V.I. of the dewaxed stock. Minimal loss of V.I. on dewaxing is desirable.

BRIEF DESCRIPTION OF THE INVENTION

It has now been found that catalytic dewaxing of a hydrocarbon oil is advantageously done by contacting said oil and hydrogen with a dewaxing catalyst comprising a dense crystalline zeolite having an effective pore diameter greater than 5 Angstroms and having associated therewith, as more fully described hereinbelow, a nickel-tungsten hydrogenation component. The dewaxed product produced by the method of this invention is unexpectedly stable, i.e. it is more resistant to oxidation or sludge formation or both. When the catalytic dewaxing method of this invention is applied in the refining of distillate lube oil stocks, this same improved stability and color is achieved and in addition the dewaxing may be effected with reduced loss of V.I.

In all cases, i.e. whether manufacturing high quality lubes or other products, the product produced by the method of this invention is surprisingly stable and requires less post-treatment by hydrofinishing, or lesser amount of additives, or both, to match the stability of prior-art catalytically dewaxed product. Thus, in a sense the process of this invention provides a combination of catalytic hydrodewaxing and hydrotreating.

PREFERRED EMBODIMENTS

The catalyst useful in this invention comprises a dense crystalline zeolite having an effective pore diameter greater thn 5 Angstroms and a nickel-tungsten hydrogenation component. These components are intimately associated in a catalyst particle. Mordenite may be used as the crystalline zeolite. The preferred crystalline zeolite is a member of a novel class of zeolites having a silica to alumina ratio of at least 12, and a Constraint Index of 1 to 12. By a dense zeolite we mean a zeolite that has a density in the hydrogen form of not substantially less than 1.6 grams per cubic centimeter. The catalyst contains about 0.7 to about 7 wt.% nickel and about 2.1 to about 21 wt.% tungsten, expressed as metal, which functions as hydrogenation component. The zeolite and hydrogenation component may be dispersed in a matrix such as alumina or clay. A particularly preferred dense zeolite is ZSM-5 having a crystallite size of less than about 0.05 microns.

The preferred crystalline zeolites useful herein are members of a novel class of zeolites that exhibit unusual properties. Although these zeolites have unusually low alumina contents, i.e. high silica to alumina ratios, they are very active even when the silica to alumina ratio exceeds 30. The activity is surprising since catalytic activity is generally attributed to framework aluminum atoms and/or cations associated with these aluminum atoms. These zeolites retain their crystallinity for long periods in spite of the presence of steam at high temperature which induces irreversible collapse of the framework of other zeolites, e.g. of the X and A type. Furthermore, carbonaceous deposits, when formed, may be removed by burning at higher than usual temperatures to restore activity. These zeolites, used as catalysts, generally have low coke-forming activity and therefore are conducive to long times on stream between regenerations by burning with oxygen-containing gas such as air.

An important characteristic of the crystal structure of this class of zeolites is that it provides constrained access to and egress from the intracrystalline free space by virtue of having an effective pore size intermediate between the small pore Linde A and the large pore Linde X, i.e. the pore windows of the structure have about a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra. Briefly, the preferred type zeolites useful in this invention possess, in combination: a silica to alumina mole ratio of at least about 12; and a structure providing constrained access to the crystalline free space.

The silica to alumina ratio referred to may be determined by conventional analysis. This ratio is meant to represent, as closely as possible, the ratio in the rigid anionic frmework of the zeolite crystal and to exclude aluminum in the binder or in cationic or other form within the channels. Although zeolites with a silica to alumina ratio of at least 12 are useful, it is preferred to use zeolites having higher ratios of at least about 30. Such zeolites, after activation, acquire an intracrystalline sorption capacity for normal hexane which is greater than that for water, i.e. they exhibit "hydrophobic" properties. It is believed that this hydrophobic character is advantageous in the present invention.

The preferred zeolites useful in this invention have an effective pore size such as to freely sorb normal hexane. In addition, the structure must provide constrained access to larger molecules. It is sometimes possible to judge from a known crystal structure whether such constrained access exists. For example, if the only pore windows in a crystal are formed by 8-membered rings of oxygen atoms, then access by molecules of larger cross-section than normal hexane is excluded and the zeolite is not of the desired type. Windows of 10-membered rings are preferred, although in some instances excessive puckering of the rings or pore blockage may render these zeolites ineffective. 12-membered rings usually do not offer sufficient constraint to produce the advantageous conversions, although the puckered 12-ring structure of TMA offretite shows constrained access. Other 12-ring structures may exist which, due to pore blockage or to other cause, may be operative.

Rather than attempt to judge from crystal structure whether or not a zeolite possesses the necessary constrained access to molecules larger than normal paraffins, a simple determination of the "Constraint Index" as herein defined may be made by passing continuously a mixture of an equal weight of normal hexane and 3-methylpentane over a small sample, approximately one gram or less, of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 1000° F. for at least 15 minutes. The zeolite is then flushed with helium and the temperature is adjusted between 550° F. and 950° F. to give an overall conversion between 10% and 60%. The mixture of hydrocarbons is passed at 1 liquid hourly space velocity (i.e., 1 volume of liquid hydrocarbon per volume of zeolite per hour) over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "Constraint Index" is calculated as follows:

$$\text{Constraint Index} = \frac{\log_{10}(\text{fraction of n-hexane remaining})}{\log_{10}(\text{fraction of 3-methylpentane remaining})}$$

The Constraint Index approximates the ratio of the cracking rate constants for the two hydrocarbons. Zeolites suitable for the present invention are those having a Constraint Index of 1 to 12. Constraint Index (CI) values for some typical zeolites are:

| CAS | C.I. |
|---|---|
| ZSM-4 | 0.5 |
| ZSM-5 | 8.3 |
| ZSM-11 | 8.7 |
| ZSM-12 | 2 |
| ZSM-23 | 9.1 |
| ZSM-35 | 4.5 |
| ZSM-38 | 2 |
| TMA Offretite | 3.7 |
| Beta | 0.6 |
| H-Zeolon (mordenite) | 0.4 |
| REY | 0.4 |
| Amorphous Silica-Alumina | 0.6 |
| Erionite | 38 |

The above-described Constraint Index is an important and even critical definition of those zeolites which are useful in the instant invention. The very nature of this parameter and the recited technique by which it is determined, however, admit of the possibility that a given zeolite can be tested under somewhat different conditions and thereby have different Constraint Indexes. Constraint Index seems to vary somewhat with severity of operation (conversion) and the presence or absence of binders. Therefore, it will be appreciated that it may be possible to so select test conditions to establish more than one value in the range of 1 to 12 for the Constraint Index of a particular zeolite. Such a zeolite exhibits the constrained access as herein defined and is to be regarded as having a Constraint Index of 1 to 12. Also contemplated herein as having a Constraint Index of 1 to 12 and therefore within the scope of the novel class of highly siliceous zeolites are those zeolites which, when tested under two or more sets of conditions within the above-specified ranges of temperature and conversion, produce a value of the Constraint Index slightly less than 1, e.g. 0.9, or somewhat greater than 12, e.g. 14 or 15, with at least one other value of 1 to 12. Thus, it should be understood that the Constraint Index value as used herein is an inclusive rather than an exclusive value. That is, a zeolite when tested by any combination of conditions within the testing definition set forth hereinabove and found to have a Constraint Index of 1 to 12 is intended to be included in the instant catalyst definition regardless that the same identical zeolite tested under other defined conditions may give a Constraint Index value outside of 1 to 12.

The class of zeolites defined herein is exemplified by ZSM-5, ZSM-11, ZSM-12, ZSM-23, ZSM-35, ZSM-38, and other similar materials. U.S. Pat. No. 3,702,886 describing and claiming ZSM-5 is incorporated herein by reference.

ZSM-11 is more particularly described in U.S. Pat. No. 3,709,979, the entire content of which is incorporated herein by reference.

ZSM-12 is more particularly described in U.S. Pat. No. 3,832,449, the entire content of which is incorporated herein by reference.

ZSM-23 is more particularly described in U.S. Pat. No. 4,076,842, the entire content of which is incorporated herein by reference.

ZSM-35 is more particularly described in U.S. Pat. No. 4,016,245, the entire content of which is incorporated herein by reference.

ZSM-38 is more particularly described in U.S. Pat. No. 4,046,859, the entire content of which is incorporated herein by reference.

The specific zeolites described, when prepared in the presence of organic cations, are substantially catalytically inactive, possibly because the intracrystalline free space is occupied by organic cations from the forming solution. They may be activated by heating in an inert atmosphere at 1000° F. for one hour, for example, followed by base exchange with ammonium salts followed by calcination at 1000° F. in air. The presence of organic cations in the forming solution may not be absolutely essential to the formation of this type zeolite; however, the presence of these cations does appear to favor the formation of this special class of zeolite. More generally, it is desirable to activate this type catalyst by base exchange with ammonium salts followed by calcination in air at about 1000° F. for from about 15 minutes to about 24 hours.

Natural zeolites may sometimes be converted to this type zeolite catalyst by various activation procedures and other treatments such as base exchange, steaming, alumina extraction and calcination, in combinations. Natural minerals which may be so treated include ferrierite, brewsterite, stilbite, dachiardite, epistilbite, heulandite, and clinoptilolite. The preferred crystalline zeolites are ZSM-5, ZSM-11, ZSM-12, ZSM-23, ZSM-35, and ZSM-38, with ZSM-5 being particularly preferred.

In a preferred aspect of this invention, the zeolites hereof are selected as those having a crystal framework density, in the dry hydrogen form, of not less than about 1.6 grams per cubic diameter. It has been found that zeolites which satisfy all three of these criteria are most desired. Therefore, the preferred zeolites of this invention are those having a Constraint Index as defined above of about 1 to about 12, a silica to alumina ratio of at least about 12 and a dried crystal density of not less than about 1.6 grams per cubic centimeter. The dry density for known structures may be calculated from the number of silicon plus aluminum atoms per 1000 cubic Angstroms, as given, e.g., on Page 19 of the article of Zeolite Structure by W. M. Meier. This paper, the entire contents of which are incorporated herein by reference, is included in "Proceedings of the Conference on Molecular Sieves, London, April 1967," published by the Society of Chemical Industry, London, 1968. When the crystal structure is unknown, the crystal framework density may be determined by classical pyknometer techniques. For example, it may be determined by immersing the dry nitrogen form of the zeolite in an organic solvent which is not sorbed by the crystal. Or, the crystal density may be determined by mercury porosimetry, since mercury will fill the interstices between crystals but will not penetrate the intracrystalline free space. It is possible that the unusual sustained activity and stability of this class of zeolites is associated with its high crystal anionic framework density of not less than about 1.6 grams per cubic centimeter. This high density must necessarily be associated with a relatively small amount of free space within the crystal, which might be expected to result in more stable structures. This free space, however, is important as the locus of catalytic activity.

Crystal framework densities of some typical zeolites including some which are not within the purview of this invention are:

| Zeolite | Void Volume | Framework Density |
|---|---|---|
| Ferrierite | 0.28 cc/cc | 1.76 g/cc |
| Mordenite | .28 | 1.7 |
| ZSM-5, -11 | .29 | 1.79 |
| ZSM-12 | — | 1.8 |
| ZSM-23 | — | 2.0 |
| Dachiardite | .32 | 1.72 |
| L | .32 | 1.61 |
| Clinoptilolite | .34 | 1.71 |
| Laumontite | .34 | 1.77 |
| ZSM-4, Omega | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

When synthesized in the alkali metal form, the zeolite is conveniently converted to the hydrogen form, generally by intermediate formation of the ammonium form as a result of ammonium ion exchange and calcination of the ammonium form to yield the hydrogen form. In addition to the hydrogen form, other forms of the zeolite wherein the original alkali metal has been reduced to less than about 1.5 percent by weight may be used. Thus, the original alkali metal of the zeolite may be replaced by ion exchange with other suitable metal cations of Groups I through VIII of the Periodic Table, including, by way of example, nickel, copper, zinc, palladium, calcium or rare earth metals.

In the dewaxing process of this invention, it may be desirable to incorporate the above-described crystalline aluminosilicate zeolite in another material resistant to the temperature and other conditions employed in the process. Such matrix materials include synthetic or naturally occurring substances as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families, which families include the sub-bentonites and the kaolins commonly known as Dixie, McNamee-Georgia and Florida clays or others in which the main mineral constitutent is halloysite, kaolinite, dickite, nacrite or anauxite. Such clays can be used in the raw state as originally mined or initially subjected to calcination, acid treatment or chemical modification.

In addition to the foregoing materials, the zeolites employed herein may be composited with a porous matrix material, such as alumina, silica-alumina, silica-magnesia, silica-zirconia, silica-thoria, silica-berylia, silica-titania as well as ternary compositions, such as silica-alumina-thoria, silica-alumina-zirconia, silica-alumina-magnesia and silica-magnesia-zirconia. The matrix may be in the form of a cogel. The relative proportions of zeolite component and inorganic oxide gel matrix on an anhydrous basis may vary widely with the zeolite content ranging from between about 10 to about 99 percent by weight and more usually in the range of about 25 to about 80 percent by weight of the dry composite.

The nickel-tungsten hydrogenation component may be incorporated with catalyst by impregnation or by any other known means. Pellets of the hydrogen form zeolite, for example, may be impregnated with aqueous solutions of ammonium metatungstate and nickel nitrate to associate the zeolite with the hydrogenation component. The method by which the hydrogenation component is brought into association with the zeolite is not believed to be critical.

The dewaxing process of this invention comprises contacting the hydrocarbon oil to be dewaxed and hydrogen with the above-described catalyst at a temperature of about 450° to 950° F., a pressure of 50 to 3000 psig (pounds per square inch gage) and at a space velocity of 0.1 to 20 LHSV (Liquid Hourly Space Velocity, i.e. volumes of oil per volume of catalyst per hour) to effect the desired reduction of pour point, freeze point, or other measure of wax content as required. The recovered dewaxed product is characterized by unusual stability, indicated by a low bromine number relative to such oil treated comparably with a prior-art catalyst. Bromine number, being a measure of unsaturation and reactivity, is believed also to be a good index of stability, higher numbers indicating less resistance to oxidation, sludge formation, or both.

Any hydrocarbon oil, regardless of source, that boils above 350° F. and has an unacceptable content of waxy hydrocarbons such that its pour point is unacceptable, may be benefited by the process of this invention. Thus hydrocracked oils, oils derived from coal or tar sands, and most particularly petroleum oils, may be treated to produce, for example, jet fuel, heating oil, diesel fuel, or even crude oil of reduced pour point.

The process of this invention is well-suited to producing high quality distillate lubricating oils from petroleum fractions. In the description which follows, particular reference will be made to the preparation of hydrocarbon lubricating oil stocks from suitable crude petroleum fractions. Within this context, a suitable crude petroleum, for purposes of this invention, is one from which may be prepared (i.e. contains) a dewaxed lubricating oil having a V.I. of at least about 85, and a pour point not greater than +25° F., by conventional methods of distillation, solvent refining and dewaxing. Also contemplated as within the scope of this invention for use as feed thereto is any hydrocarbon lubricating oil stock boiling within the range of from 450, and preferably from about 600° to about 1050° F., and capable of yielding significant amounts of dewaxed lubricating oil having a V.I. of at least about 85 and a pour point not greater than +25° F. Thus, hydrocracked petroleum oils having the foregoing characteristics are included within the scope of this invention, as well as are other processed heavy oils whether derived from tar sands, coal, or from other sources. The boiling points herein referred to are boiling points at atmospheric pressure, and may be determined by vacuum assay in the manner known to those skilled in the art.

In a preferred embodiment of this invention, the raw stock hereinabove described is solvent refined by countercurrent extraction with at least an equal volume (100 vol.%) of a selective solvent such as furfural. It is preferred to use 1.5 to 2.5 volumes of solvent per volume of oil. The raffinate is subjected to catalytic dewaxing by mixing with hydrogen and contacting a 500° to about 750° F. with the above-described catalyst. The catalytic dewaxing preferably is conducted at a liquid hourly space velocity (LHSV) of 0.1 to 5.0 volumes of charge oil per volume of catalyst per hour.

In some instances it may be desirable to partially dewax the solvent-refined stock by conventional solvent dewaxing techniques, say to a pour point from 20° to about 50° F., and preferably to a pour point greater than about +25° F., prior to catalytic dewaxing. The higher melting point waxes so removed are those of greater hardness and higher market value than the waxes removed in taking the product to a still lower pour point.

The cracked fragments from cracking wax molecules in the catalytic dewaxer will have adverse effects on flash and fire points of the product and preferably are therefore removed by distillation of the product to flash and fire point specifications.

The catalytic dewaxing step of this invention may be conducted by contacting the feed to be dewaxed with a fixed stationary bed of catalyst, with a fixed fluidized bed, or with a transport bed, as desired. A simple and therefore preferred configuration is a trickle-bed operation in which the feed is allowed to trickle through a stationary fixed bed, preferably in the presence of hydrogen. With such configuration, it is of considerable importance in order to obtain maximum benefits from this invention to initiate the reaction with fresh catalyst at a relatively low temperature such as 500° to 600° F. This temperature is of course raised at the catalyst ages, in order to maintain catalytic activity. In general, for lube oil base stocks the run is terminated at an end-of-run temperature of about 750° F., at which the catalyst may be regenerated by contact at elevated temperature with hydrogen gas, for example, or by burning in air or other oxygen-containing gas.

In general, for the purpose of manufacturing a refined lubricating oil stock according to this invention, the dewaxing step preferably is conducted at a LHSV of from 0.1 to 5.0, a temperature from about 500° to about 750° F., and at a pressure of about 200 to 2000 psig. As indicated above, however, reaction conditions for the dewaxing step broadly include, in combination, a temperature of about 450° to 950° F., a pressure of 200 to 3000 psig, and a LHSV of 0.1 to 20 with a hydrogen circulation rate of 500 to 20,000 SCF/bbl (standard cubic feet per barrel of feed). The combination of reaction conditions are chosen such as to effect a reduction of the pour point, or the freeze point, or the cloud point, or the CFPP (cold filter plugging point) of the feed of at least 5° F., and preferably at least 10° F. The terms pour point, cloud point, and CFPP refer to those characteristics of the feed or product as defined by test procedures currently specified by the American Society for Testing Materials or equivalent.

The precise process conditions selected for the process of this invention will of course depend on the nature and wax content of the feed, and the specifications for the product. In general, however, it is a feature of this invention that most usually not more than about 20 wt.% of the feed is converted to dewaxed product boiling lower than the feed.

The novel process of this invention is concerned with catalytic dewaxing of hydrocarbon feedstocks. The term "dewaxing" as used in the specification and claims is used in its broadest sense and is intended to mean the conversion or removal of those hydrocarbons which readily solidify (waxes) from petroleum stocks.

The improved process of this invention will now be illustrated by examples which are not to be construed as limiting the invention as described in this specification including the attached claims. All parts and proportions in these examples are by weight unless explicitly stated to be otherwise.

EXAMPLE 1

This example illustrates the preparation of a catalyst useful in this invention.

A mixture of 65 wt.% ZSM-5 having a crystallite size of less than 0.05 microns and 35 wt.% alumina on an anhydrous basis was extruded to form 1/16 inch pellets. The pellets were calcined at 1000° F. in nitrogen, ammonium exchanged, and then calcined in air.

100 grams of the air-calcined extrudate was impregnated with 13.4 grams of ammonium metatungstate (72.3% W) in 60 cc of water, followed by drying at 240° C. and calcination in air at 1000° F. The extrudate was then impregnated with 15.1 grams of nickel hexahydrate in 60 cc of water, and the wet pellets dried and again calcined at 1000° F.

The final catalyst had a calculated nickel content of about 3.4 wt.% as NiO and a calculated tungsten content of about 10.5 wt.% as $WO_3$.

EXAMPLE 2

A mixture of Nigerian and Arab Light gas oils was dewaxed with the catalyst of Example 1 and with a a prior art Ni-ZSM-5 (Nickel-ZSM-5) catalyst. The gas oil feed had the following properties:

| | |
|---|---|
| Gravity, °API | 27.0 |
| Bromine No. | 1.6 |
| Hydrogen, wt. % | 12.77 |
| Sulfur, wt. % | 1.26 |
| Nitrogen, ppm | 600 |
| Pour Point, °F. | 80 |

The dewaxing conditions and the yield and properties of the product are shown in Table I.

TABLE I

| Catalyst | Example 1 | Prior Art Ni/ZSM-5 |
|---|---|---|
| LHSV | .87 | .87 |
| Temperature, °F. | 663 | 661 |
| $H_2$ Circulation, scf/B | 5151 | 5151 |
| $H_2$ Consumption, scf/B (Est'd.) | 250 | 170 |
| Product Properties, 330° F.+ | | |
| Yield, vol. % | 86.3 | 85.78 |
| Gravity, °API | 25.7 | 24.5 |
| Bromine No. | 1.4 | 4.5 |

TABLE I-continued

| Catalyst | Example 1 | Prior Art Ni/ZSM-5 |
|---|---|---|
| Hydrogen, wt. % (Est'd.) | 12.71 | 12.50 |
| Sulfur, wt. % | 0.36 | 1.27 |
| Nitrogen, ppm | 460 | 480 |
| Pour Point, °F. | 25 | 15 |
| Product Properties, $C_5$–330° F. | | |
| Yield, vol. % | 6.54 | 6.92 |
| Density, g/cc | .6826 | .6962 |
| Bromine No. | 15.1 | 84.8 |
| R + O | 85.2 | 91.8 |
| M + O | 74.9 | 80.0 |
| Paraffins, vol. % | 79.8 | 47.3 |
| Olefins, vol. % | 9.0 | 42.4 |
| Naphthenes, vol. % | 9.8 | 8.5 |
| Aromatics, vol. % | 1.4 | 1.8 |
| Yields | | |
| $H_2S$, wt. % | 1.00 | 0.15 |
| $NH_3$, wt. % | .04 | 0.03 |
| $C_1$–$C_3$, wt. % | 2.82 | 3.36 |
| $C_4$, vol. % | 7.04 | 6.56 |
| $C_5$, vol. % | 92.84 | 92.70 |
| Total, vol. % | 99.88 | 99.26 |
| 48-Hour Accelerated Storage Stability, 330+ | | |
| Initial Color | 3.0 | 4.0 |
| 48-Hour Color | L4.0 | 5.5 |
| Color Change | <1.0 | 1.5 |
| Initial Sediment, mg/l | 2.4 | 14.2 |
| 48-Hour Sediment, mg/l | 6.4 | 12.8 |

EXAMPLE 3

An Arab Light heavy neutral waxy lube oil stock was dewaxed with the catalyst of Example 1. For comparison, a prior-art Ni-ZSM-5 catalyst was also used. The waxy lube oil stock had the following properties:

| | |
|---|---|
| Gravity, °API | 28.9 |
| Bromine No. | 0.7 |
| Hydrogen, wt. % | 13.72 |
| Sulfur, wt. % | 0.79 |
| Nitrogen, ppm | 31 |
| Pour Point, °F. | 110 |

The dewaxing conditions and the properties of the dewaxed oils are summarized in Table II.

TABLE II

| Catalyst | Example 1 | Prior Art Ni-ZSM-5 |
|---|---|---|
| Days On-Stream | 12.0 | 11.5 |
| LHSV | 0.97 | 1.06 |
| Temperature, °F. | 619 | 595 |
| Pressure, psig $H_2$ | 400 | 400 |
| $H_2$ Circulation, scf/B | 5233 | 5222 |
| $H_2$ Consumption, scf/B | 247 | 56 |
| CT- | 156 | 156 |
| MB# | 610 | 604 |
| Product Properties, 330+ | | |
| Gravity, °API | 28.6 | 28.1 |
| Bromine No. | 1.3 | 4.0 |
| Hydrogen, wt. % | 13.45 | 13.44 |
| Sulfur, wt. % | 0.38 | 0.86 |
| Nitrogen, ppm | 30 | 35 |
| Pour Point, °F. | 5 | 10 |
| Product Properties, 450+ | | |
| KV @ 100° C., cs | 10.29 | 10.71 |
| KV @ 40° C., cs | 91.76 | 99.50 |
| V.I. | 92.2 | 89.3 |
| Pour Point, °F. | 15 | 0 |
| Yields | | |
| $C_1$–$C_3$, wt. % | 4.6 | 2.4 |
| $C_4$, vol. % | 11.8 | 6.5 |

TABLE II-continued

| Catalyst | Example 1 | Prior Art Ni-ZSM-5 |
|---|---|---|
| C$_5$–330° F., vol. % | 8.0 | 9.3 |
| 330+, vol. % | 84.0 | 87.7 |
| Total | 103.8 | 103.5 |

What is claimed is:

1. A process for dewaxing a hydrocarbon oil boiling above 350° F. which comprises contacting said oil and H$_2$ gas at a temperature of about 450° to 950° F., a pressure of 50 to 3000 psig, a space velocity of 0.1 to 20 LHSV, and an H$_2$ circulation rate of 500 to 20,000 SCF/bbl, with a catalyst comprising a nickel-tungsten hydrogenation component and a crystalline zeolite having an effective pore diameter greater than 5 Angstroms and a crystal framework density, in the dry hydrogen form, of not less than about 1.6 grams per cubic centimeter.

2. The process claimed in claim 1 wherein said hydrogenation component consists of about 0.7 to about 7 wt.% nickel and about 2.1 to about 21 wt.% tungsten expressed as metal based on said catalyst, and said crystalline zeolite is ZSM-5.

3. The process described in claim 2 wherein said said crystalline zeolite is contained in an alumina matrix.

4. The process described in claim 3 wherein said crystalline zeolite is ZSM-5 having a crystallite size of less than about 0.05 microns.

5. The process described in claim 1 or claim 2 or claim 3 or claim 4 wherein said hydrocarbon oil is a petroleum distillate.

6. In a process for manufacturing a refined lubricating oil stock having a V.I. of at least 85 and a pour point not greater than +25° F. from a waxy stock boiling within the range of from about 450° to about 1050° F., said process comprising catalytically dewaxing said waxy stock to a pour point not greater than +25° F., the improvement whereby dewaxed oil having good stability is formed, which comprises: contacting said waxy stock and H$_2$ gas with a catalyst comprising a nickel-tungsten hydrogenation component and a crystalline zeolite having a silica to alumina ratio of at least 12 and a Constraint Index of 1 to 12, said contacting being at a LHSV of from 0.1 to 5.0, a temperature from about 500° to about 750° F., and an H$_2$ circulation rate of 500 to 20,000 SCF/bbl; and recovering a dewaxed oil stock with a pour point not greater than +25° F.

7. The process claimed in claim 6 wherein said hydrogenation component consists of about 0.7 to about 7 wt.% nickel and about 2.1 to about 21 wt.% tungsten expressed as metal based on said catalyst, and said crystalline zeolite is ZSM-5.

8. The process claimed in claim 6 wherein said hydrogenation component and said crystalline zeolite are contained in an alumina matrix.

9. The process claimed in claim 6 wherein said waxy stock is partially solvent dewaxed prior to said contacting step.

10. The process claimed in claim 7 wherein said waxy stock is partially solvent dewaxed prior to said contacting step.

11. The process claimed in claim 6 wherein said waxy stock is a waxy solvent-refined stock.

12. The process claimed in claim 7 wherein said waxy stock is a waxy solvent-refined stock.

13. The process claimed in claim 8 wherein said waxy stock is a waxy solvent-refined stock.

14. The process claimed in claim 10 wherein said waxy stock is solvent-refined prior to said dewaxing steps.

15. The process claimed in claim 2 wherein said hydrocarbon oil is a bright stock.

16. The process claimed in claim 7 wherein said hydrogenation component and said crystalline zeolite are contained in an alumina matrix.

17. The process claimed in claim 16 wherein said waxy stock is a waxy solvent-refined stock.

* * * * *